April 29, 1952     J. H. MAYLEN     2,594,961
HEDGE AND SHRUBBERY TRIMMER
Filed Jan. 5, 1950     2 SHEETS—SHEET 2
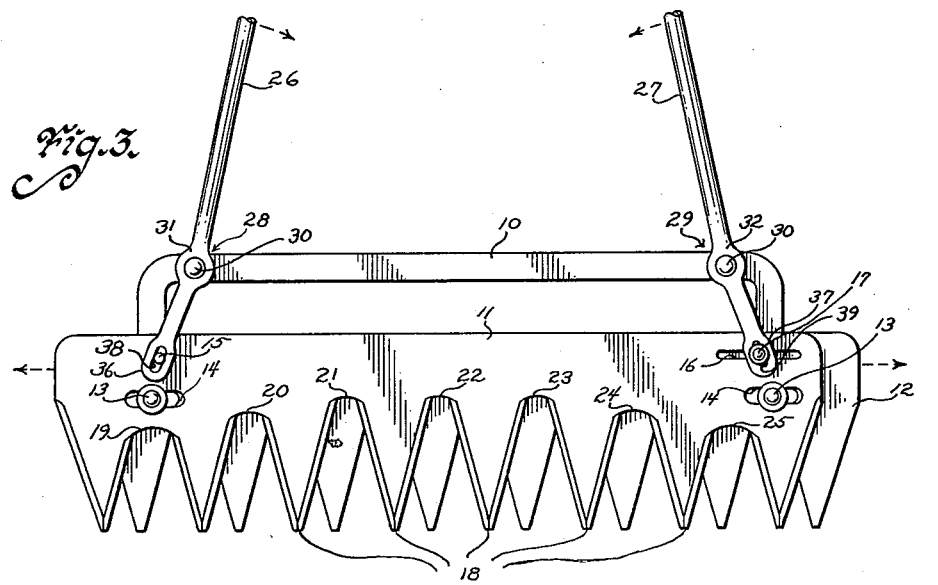
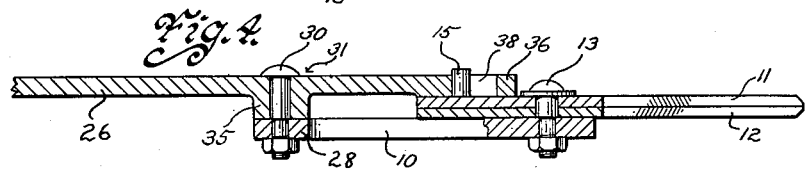
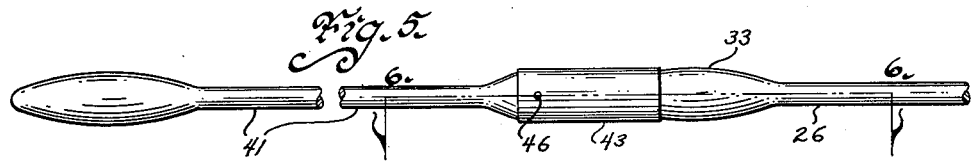
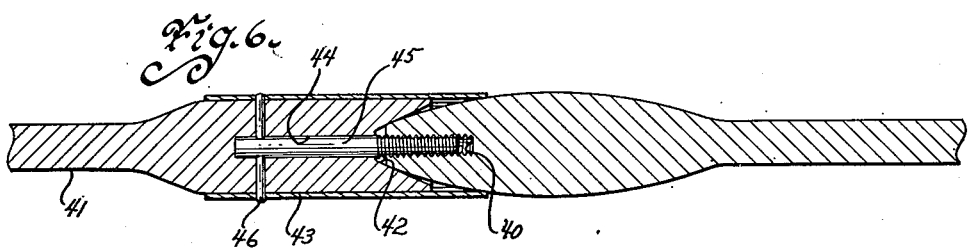

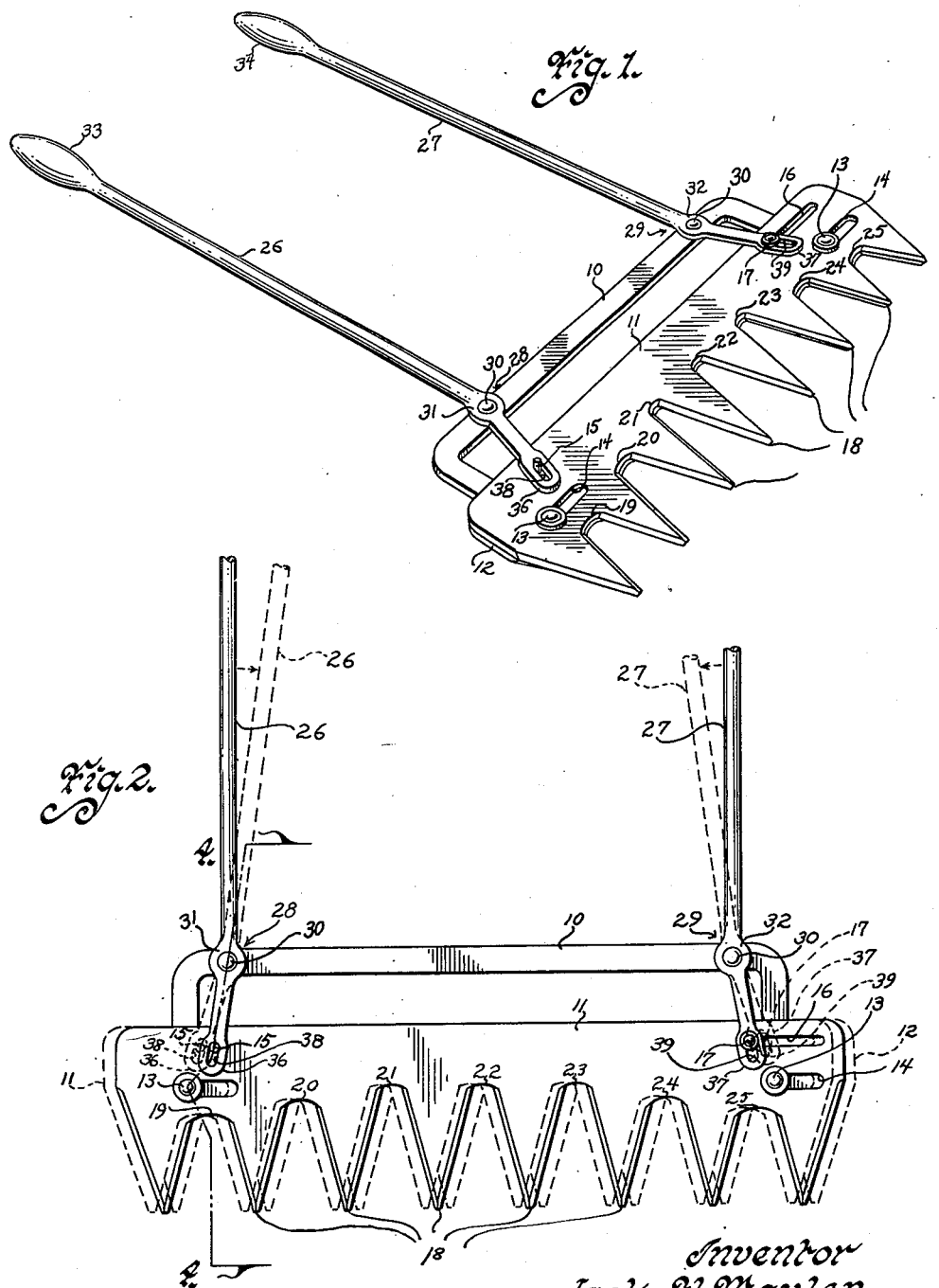

Patented Apr. 29, 1952

2,594,961

UNITED STATES PATENT OFFICE 2,594,961

HEDGE AND SHRUBBERY TRIMMER

Jack H. Maylen, Bartlesville, Okla.

Application January 5, 1950, Serial No. 136,921

4 Claims. (Cl. 30—211)

It is old in the art of hedge trimmers to join a series of cutting members together to form a multiple cutting blade. There are many forms of multiple cutting edges, trimmers or the like that are constructed so that a single pair of handles will operate a number of opposed cutting teeth. Heretofore such cutters have usually cut at each set of blades simultaneously. This uniform action of the cutters causes the device to be hard to operate. This difficulty of operation is accentuated if several cutters come into contact with rather thick branches at the same time. When a person using the multiple trimmer happened to engage a number of main branches at a single stroke, it was necessary that he either be a person of great strength or that he maneuver the trimmer to avoid some of these main branches. Whenever it became necessary to cut with less than all of the cutters, a part or nearly all of the value of the multiple cutter was lost.

At least one attempt has been made to solve this problem by making the cutters operate in a staggered relation so that a majority of the blades are more or less inoperative at any one instant. To my knowledge, the only attempt to do this in the past involved the irregular spacing of the teeth on one of the cutting blades. While such spacing will accomplish the desired result, it will require a longer blade than is necessary when the teeth are evenly spaced.

Another problem in the art of hedge trimmers or the like has been the difficulty of lengthening or shortening the handles or operating levers. Usually the clippers come with one length of handle with no provision for lengthening them. If it were desired to have a longer handle to increase leverage or to make it possible to reach the top of a tall hedge, the operator had to improvise an extension which is no easy task. Furthermore, "home-made" extensions are usually of such a nature that the original handles are injured when improvised extensions are used. An attempt to solve this problem has been made along the line of providing two or more sets of handles of various length which are relatively easily removed from the cutting assembly and changed about to provide the length of handles desired. This solution while practical from the point of view of operation, requires unfortunate duplication of materials.

With these problems in view, therefore, it is the principal object of my invention to provide a hedge and shrubbery trimmer that will have equally spaced cutting teeth that will operate in a staggered relation to each other.

It is a further object of my invention to provide such a hedge and shrubbery trimmer that is provided with extension handles that may be readily secured to or removed from the regular operating handles of the trimmer.

It is a still further object of my invention to provide a hedge and shrubbery trimmer that is economical to manufacture, durable in use, and refined in appearance.

These and other objects will be clear to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my device.

Fig. 2 is a top plan view of my device with dotted lines showing the relative movement of the cutting plates.

Fig. 3 is a top plan view of my device illustrating the staggered operation of the various teeth.

Fig. 4 is a cross-section of a portion of my device taken on the line 4—4 of Fig. 2.

Fig. 5 is a top plan view of my extension handle shown secured to a handle of my device.

Fig. 6 is a cross-section of the attaching means of the handle and the extension taken on the line 6—6 of Fig. 5.

Referring to the drawings the numeral 10 designates the U-shaped frame to the free ends of which the upper blade plate 11 and the lower blade plate 12 are slidably secured by the nut, bolt and washer assemblies 13 extending through the slots 14 in the upper and lower blade plates 11 and 12 respectively and through appropriate holes in the free ends of said frame member 10. The upper blade plate 11 has a boss 15 at one end and a boss slot 16 in its other end through which extends the boss 17 that is secured to the lower blade plate 12. The blade members 11 and 12 are of the same shape as shown in Fig. 1. They are elongated plate members straight along the back and having V-shaped saw like teeth 18 formed in the front side. Between each two teeth is a V-shaped opening, as shown in Fig. 1, Fig. 2, and Fig. 3. These openings are designed by the numerals 19, 20, 21, 22, 23, 24, and 25 of which the three center openings, 21, 22, and 23 are deeper and narrower at their bases than are openings 20 and 24. The openings 20 and 24, on the other hand, are deeper and narrower at their base than are the outermost openings 19 and 25, as shown in Fig. 1, Fig. 2, and Fig. 3.

The handles 26 and 27 are pivotally mounted on frame 10 at points 28 and 29 respectively by nut and bolt assemblies 30 extending through the bearing points 31 and 32 in the handles 26 and 27 respectively. The handles extend in the form of slender shafts from the bearing points 31 and 32 to elongated egg shaped hand grips 33 and 34. At bearing points 31 and 32 a shoulder extends downwardly to space the forward ends 36 and 37 of handles 26 and 27 away from the free ends of the frame 10 to allow room for the blade plates 11 and 12, as shown in Fig. 4. Slots 38 and 39 in the handle forward ends 36 and 37 respectively embrace bosses 15 and 17 respectively but allow for sliding movement between the slots and the bosses.

In the end of each hand grip is a threaded well 40 as shown in Fig. 6, which is used for securing handle extension 41 to each handle when that is desirable. My handle extension 41 is substantially a duplicate of my handle members down to the points 31 or 32. It will be noted that at the front end of handle extension 41, however, the extension shaft is enlarged and a conical well 42 is formed in the forward end as shown in Fig. 6. A sleeve 43 embraces this enlarged end and forms an extension of the well 42. A narrow tube like opening 44 extends rearwardly from the bottom of well 42 along the longitudinal axis of the shaft of the extension 41 and receives rod 45 which is threaded at one end so that the threaded portion of the rod 45 remains in well 42, as shown in Fig. 6. Pin 46 secures sleeve 43 and rod 45 to the end of handle extension 41 by passing through appropriate openings in the members so secured as shown in Fig. 6.

In operation the teeth 18 are inserted into a hedge or the like that is to be trimmed and the two handles are moved manually toward each other and away from each other alternately. This movement of the handles causes reciprocation of the upper and lower cutting blade plates with respect to each other producing a shearing action. Since the openings between the teeth are of different widths at their respective bases, the initial movement of the handles causes the three center teeth to cut first. This initial cutting action is followed by that of the two teeth flanking the center teeth when the handles of the device are moved additionally. Finally, the two outer teeth act as the handles are moved finally to their extreme inward or outward position. In this manner the teeth cut in an irregular or staggered relationship to each other even though their points are equally spaced.

When it is desired to have handles on the device of greater length than those that are originally on the device, the extension members are merely presented to the ends of the operating handles so as to allow the rod 45 to thread into well 40. By turning the extension 41, the two members are threaded together so that the sleeve 43 and the conical well 42 contact the end of the operating handle under tension. In this manner, the two members are secured together so that the device in effect has longer operating handles than formerly. The extensions are easily removed by reversing the process just described.

Some changes may be made in the construction and arrangement of my hedge and shrubbery trimmer without departing from the real spirit and purpose of my invention, and it is my intention to cover by my claims, any modified forms of structure or use of mechanical equivalents which may be reasonably included within their scope.

I claim:

1. In a device of the class described, a frame, an upper blade plate slidably secured to said frame and having a plurality of V-shaped cutting teeth along its forward edge; said teeth having their points equally spaced and the edges of which slant at the same angle from their respective vertical axis and are of varying lengths, a lower blade plate slidably secured to said frame and having teeth like those of the said upper blade plate, and means for slidably moving said blade plates relative to each other.

2. In a device of the class described, a pair of blade plates slidably secured together, a plurality of teeth on said blade plates; said teeth having their points equally spaced and capable of being contacted by a single straight surface; the sole difference between any said teeth being the length of the cutting edges formed thereon; said teeth having V-shaped notches between them that vary in depth and width at their inner ends according to the length of the cutting edges of said teeth forming the sides of the notches, and a means for reciprocating said blade plates with respect to each other.

3. In a device of the class described, a pair of blade plates slidably secured together, a plurality of teeth formed on each of said pair of blade plates; each of said teeth having two cutting edges formed thereon; the adjacent cutting edges on adjacent teeth being all equi-distant at their forward ends and some of them vari-distant at their rear ends; and means for reciprocating said blade plates in respect to each other; whereby some adjacent cutting edges on adjacent teeth commence a shearing cutting action sooner than do other adjacent cutting edges.

4. In a hedge and shrubbery trimmer, a pair of blade plates slidably secured to each other, a plurality of cutting teeth formed on each of said blade plates; each tooth on one plate having a corresponding matching tooth on the other plate; said teeth being equally spaced and of equal width at corresponding distances from their respective points; some of said teeth having portions thereof that extend farther from their respective points than other of said teeth, and means for reciprocating said blade plates in relation to each other; whereby the commencing of the cutting action of various pairs of corresponding teeth on said blade plates is staggered in relation to the commencing of the cutting action of other of the pairs of corresponding teeth on said blade plates.

JACK H. MAYLEN.

REFERENCES CITED

The following references are of record in the file of this patent:

UNITED STATES PATENTS

| Number | Name | Date |
| --- | --- | --- |
| 173,564 | Shaw | Feb. 15, 1876 |
| 939,346 | Sterling | Nov. 9, 1909 |
| 998,828 | Ballantine | July 25, 1911 |
| 1,177,024 | Dragos | Mar. 28, 1916 |
| 1,494,336 | Bowman | May 20, 1924 |
| 1,908,385 | Wahl | May 9, 1933 |
| 1,980,092 | Rose | Nov. 6, 1934 |
| 2,118,850 | Marcel | May 31, 1938 |
| 2,268,150 | Hollingsworth | Dec. 30, 1941 |